Jan. 11, 1966  N. E. POLSTER ETAL  3,229,301
MEANS FOR ACCUMULATING AND DISPLAYING DATA
Filed Feb. 20, 1962  7 Sheets-Sheet 1

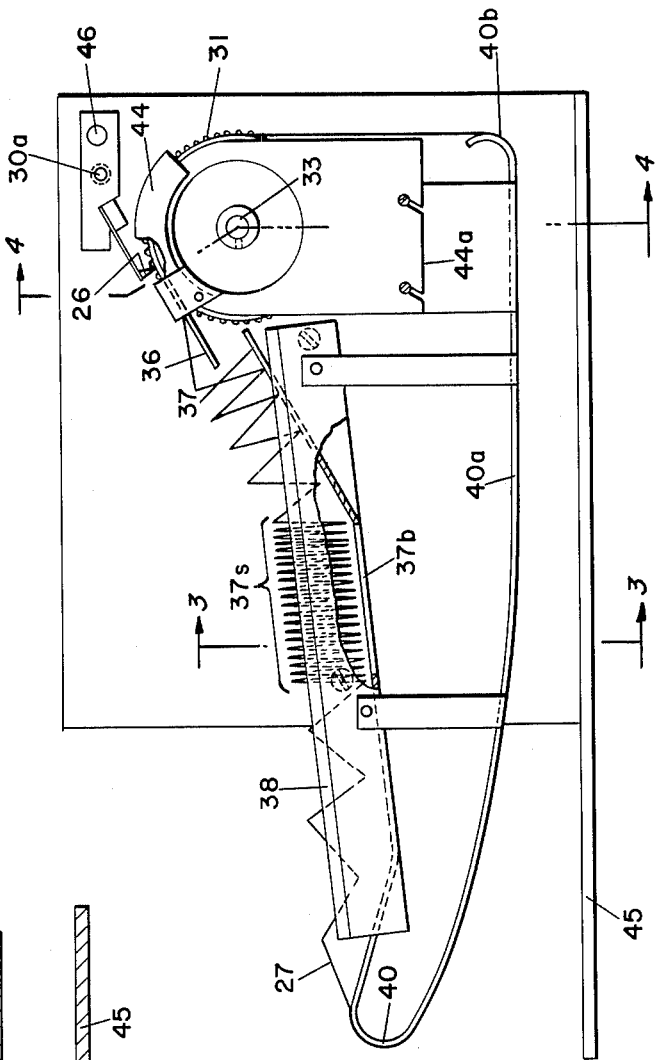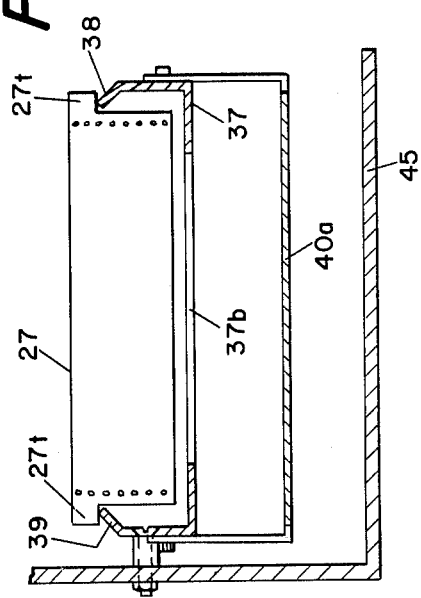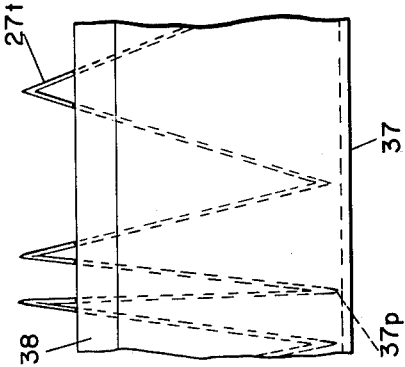

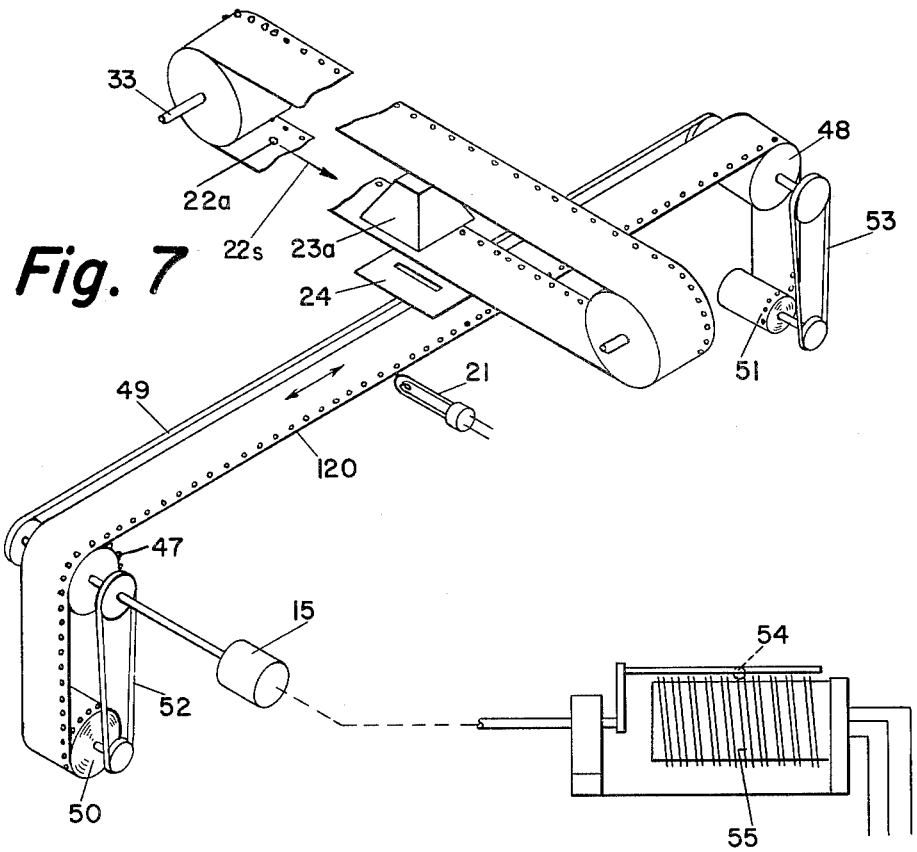
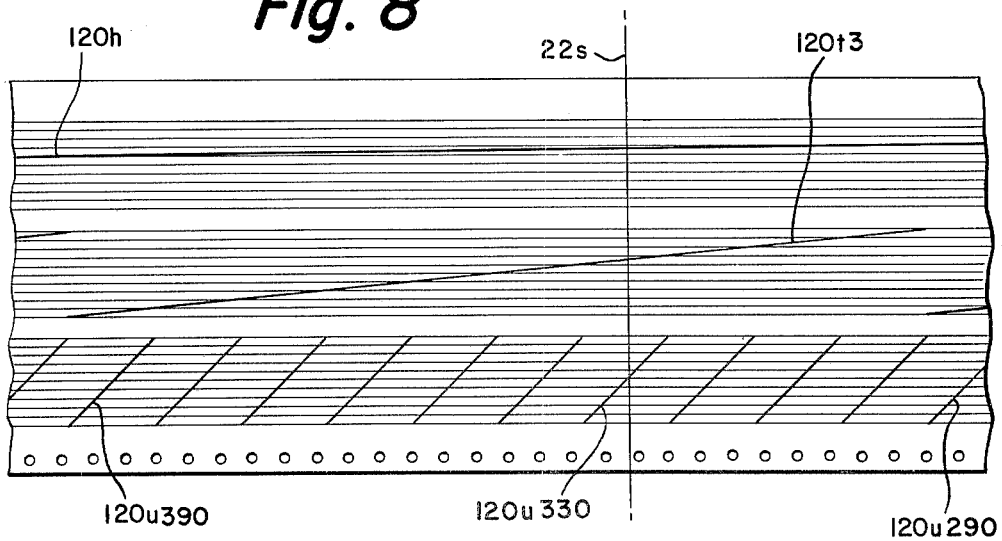

United States Patent Office 3,229,301
Patented Jan. 11, 1966

3,229,301
MEANS FOR ACCUMULATING AND
DISPLAYING DATA
Norman E. Polster, Southampton, Raymond W. Ross, Cheltenham, and Albert J. Williams, Jr., Philadelphia, Pa., assignors to Leeds and Northrup Company, Philadelphia, Pa., a corporation of Pennsylvania
Filed Feb. 20, 1962, Ser. No. 174,434
14 Claims. (Cl. 346—22)

This invention relates to high speed recorders of the type adapted to respond to a multiplicity of conditions under measurement and to produce records thereof.

Those skilled in the art are familiar with multiple point indicating and recording instruments wherein the magnitude of first one and then of additional measured variables are determined, indicated and/or recorded. While such systems have been quite satisfactory and widely used, there are many instances in which the number of measured variables greatly exceeds the possibility of accommodating them with existing instruments. For example, if the magnitude of 150 or more measured variables are to be rapidly measured and recorded, the chart itself may have to be driven at a speed in excess of that which permits visual inspection of the record received by the chart.

It is an object of the present invention to record on the chart magnitudes of a multiplicity of conditions with the chart in a recording zone moving at a speed in excess of that which permits visual inspection while in another region the chart movement is slowed by accordion folding of the chart throughout an extended length thereof. Accordingly, the folded portions of the chart may then be visually inspected while at standstill.

It is a further object of the invention to provide a multiplicity of chart panels with fold lines to assist in producing accordion folding of the chart and with each of the several panels of the chart receiving a record of the magnitude of a different measured variable.

In carrying out the invention in one form thereof, there is utilized a chart-handling mechanism comprising a drive means for moving in a predetermined path a pre-folded chart having fold lines by means of which the chart may be accordion-folded into a plurality of individual panels. As each panel is driven through a recording zone or region a marker is utilized to produce on the chart a record of the magnitude of the condition corresponding with a panel of the chart. By driving the panels one after the other through the recording zone at high speed there may be rapidly recorded the magnitudes of a plurality of conditions of measured variables. For example, with 150 measured variables, the magnitudes of which are to be recorded, 150 panels may be driven through the recording zone in a time interval of the order of 30 seconds. Adjacent the recording zone or station, the chart is accordion-folded as by guide means which is not only arranged to support the chart as it is decelerated in its movement from the recording zone but also to induce the accordion-folding of the chart and thereafter to move the accordion-folded chart through a storage station or region constituting a part of the path of the chart.

In the storage or inspection station, access is provided to the chart so that by spreading or lifting any selected panel thereof the record of changes in the magnitude of a condition recorded on the selected panel may be observed at length—for several seconds. Preferably the chart is provided with tabs disposed near the apices of its folds at or near the fold lines and by means of these tabs and associated supporting rails the chart panels will hang freely and thus can be readily lifted from the storage region for inspection purposes as just described.

The driving means for the chart is arranged to pull from the storage region the accordion-folded chart. The chart is progressively unfolded and accelerated to the high speed at which it is driven through the recording zone.

Further in accordance with the invention, a preferred recording arrangement includes a measuring system with means for producing individual records on each panel of the chart of the analog-decimal type. In brief, a scanning disc is driven with the balancing slidewire or contact of a self-balancing instrument such as a potentiometer used for null determination of the magnitudes of measured variables. The disc will effect recording of columns of calibration lines on each panel of the chart and a mark in each column for each significant digit is utilized in producing the record. Examples will be set forth for a two-digit and a three-digit arrangement, it being understood that as many digits may be utilized as may be desired and other forms and means for recording may be used.

For further objects and advantages of the invention and for examples of several embodiments thereof, reference is to be had to the following detailed description taken in conjunction with the accompanying drawings, in which:

FIG. 1 diagrammatically illustrates, partly in perspective, a system embodying the present invention;

FIG. 2 is a front elevation, partly in section, of the recorder of this invention;

FIG. 2a is an enlarged view showing how the chart tabs are supported by the guide rails;

FIG. 3 is a partial section of the storage station of the recorder taken on the line 3—3 of FIG. 2;

FIG. 7 is a diagrammatic showing, partly in perspective, illustrating the use of a light transmitting belt and a multiturn slidewire instead of the light transmitting disc and the 324° slidewire in the measuring and converting portion of the system of FIG. 1;

FIG. 8 is an enlarged view of a section of the light transmitting belt of FIG. 7 where the transparent lines are shown in black;

Figure 1:
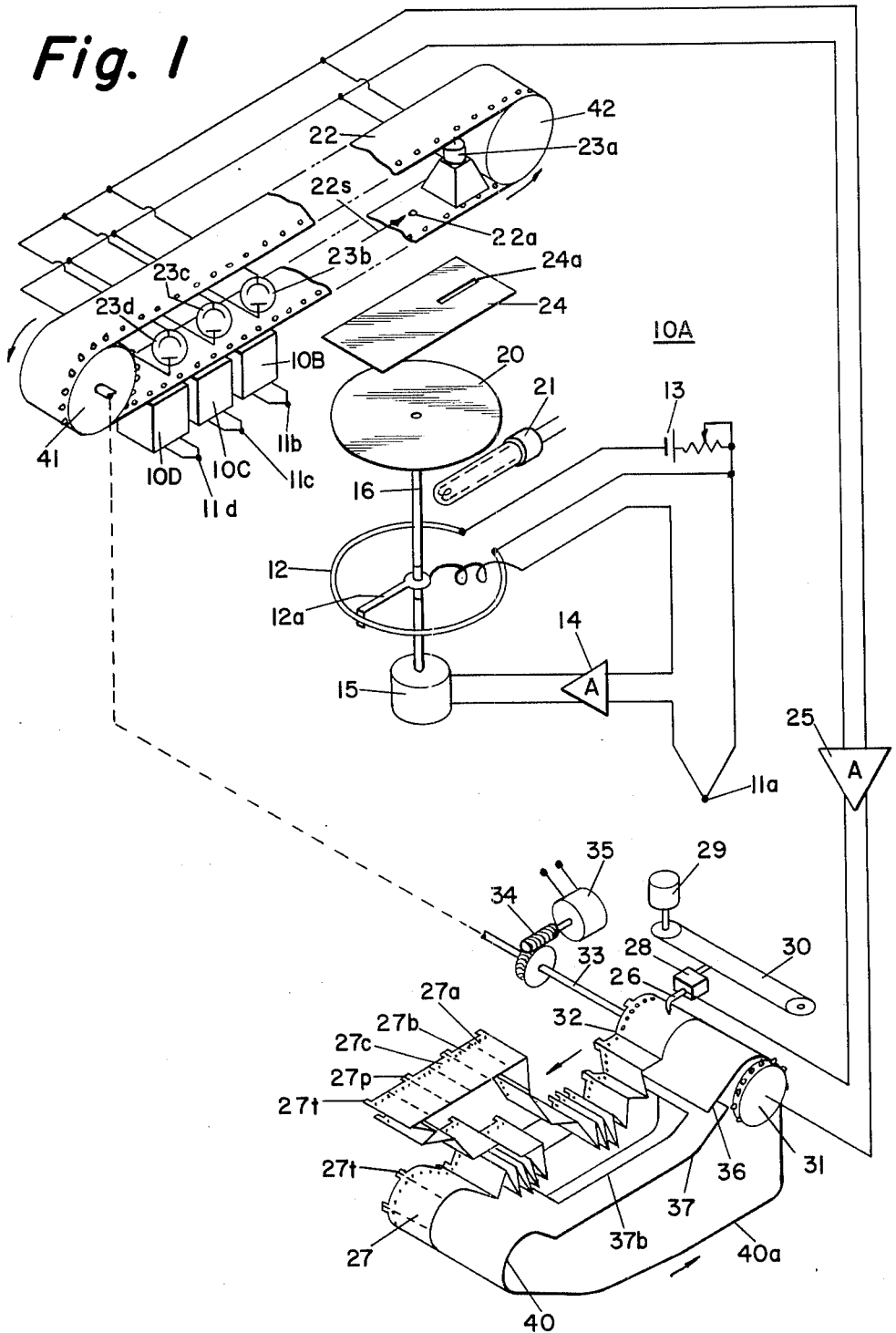

Referring now to FIG. 1, the invention has been shown in one form as applied to a measuring system including a plurality of measuring systems 10A–10D for the determination of the magnitudes of a plurality of conditions or measured variables, such for example, as the temperatures to which a plurality of thermocouples 11a–11d may be subjected. While only four thermocouples have been shown in FIG. 1, it is to be understood that the present system particularly lends itself to a substantially continuous measurement and recording of a large number of variables, whether temperature, pressure, flow, strain, or changes in magnitudes of chemical reactions including pH. It is further to be understood that the measured variables may be of different kinds in the same system.

For each measured variable, there is preferably provided a null type of measuring system which will include a balancing means. For the system 10A that balancing means comprises a slidewire 12 relatively movable with respect to its associated contact 12a. As shown, the slidewire 12 comprises a single-turn 324° resistor which is a part of a potentiometer measuring circuit of conventional type having a source of E.M.F. shown as a battery 13 in series with a rheostat and the slidewire. Thus any difference between the voltage developed by the thermocouple 11a and the voltage of the potentiometer applies to an amplifier 14 a difference signal which energizes a motor 15 in a direction to move the contact 12a in a direction to decrease the difference or error signal applied to amplifier 14. It is in this manner that the motor shaft 16 is driven to angular positions representative of magnitudes of the measured variable, specifically the temperature of thermocouple 11a.

In order rapidly to record the magnitudes of a multiplicity of measured variables, as for example, 150 or more, and within a relatively short period of time, as for example, 30 seconds and less, each balancing motor such as motor 15 is arranged to drive as from shaft 16 an analog-decimal converting means shown in FIG. 1 in the form of a light transmitting disc 20 provided with a light source 21 which provides illumination radially of the disc 20. As will be later explained, the disc 20 has light transmitting patterns thereon which, in conjunction with a scanning means shown as an aperture 22a of a scanning belt 22 moving along path 22s, energizes light sensitive means shown as a photocell 23a disposed in light-gathering position relative to a mask 24 having a slit 24a also disposed radially of disc 20. The output of the photocell 23a is applied to an amplifier 25 which is effective to apply by way of a stylus or marker 26 an electrical potential to a chart 27. The stylus 26 mounted on a carriage 28 is driven by a timing motor 29 as by an endless cord or violin string 30 from the lower or right-hand margin of the chart as viewed in FIG. 1, which corresponds with time $T_0$, to the upper or left-hand edge of the chart. The traverse from edge to edge is arranged to take place in any desired period of time such, for example, as that corresponding with the average working day of eight hours.

As already mentioned, the chart 27 is prefolded into a plurality of panels, preferably one panel for each measured variable. The chart 27 is shown as endless, and it is provided with scoring hereinafter referred to as fold-lines, by means of which the chart may be accordion-folded.

Figure 4:
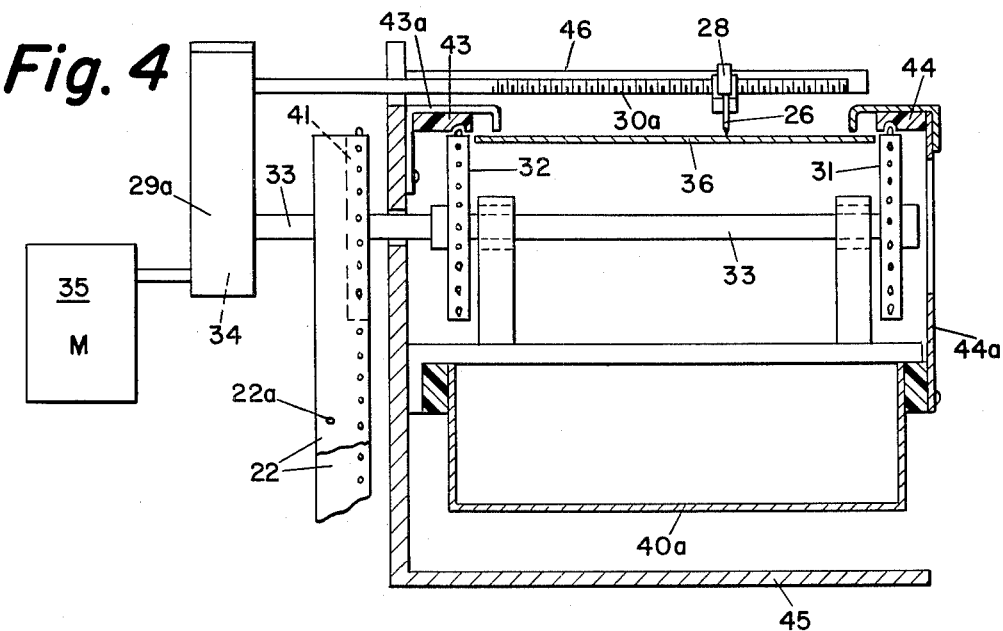
FIG. 4 is a sectional view of the recorder taken on the line 4—4 of FIG. 2.

As best shown in FIG. 4, the chart 27 is provided with driving means, such, for example, as a pair of sprockets 31 and 32 driven by a shaft 33 by way of gearing 34 and a driving motor 35 of the constant speed type. The motor 35 drives the chart 27 at a relatively high speed. Satisfactory records have been produced with the linear speed of the chart, as produced by the sprockets 31 and 32, beneath the stylus 26 of the order of fifty inches per second. With the chart driven at a much lower speed as, for example, about fourteen inches per second, 150 panels will be moved past the stylus in a period of about thirty seconds, where each panel has a dimension between score lines of 2⅜ inches. Even at this relatively low speed, there will be produced marks on each moving panel at a rate much greater than that which will permit visual inspection of the record. Nevertheless, the record of one or more selected measured variables may be visually inspected for an adequate length of time to ascertain the nature and character of changes in that measured variable as recorded on its panel of the chart by reason of the chart handling mechanism, details of which are best shown in FIGS. 1–4.

In FIGS. 1–4 the recording location for a panel will, of course, correspond with the location and travel path of the stylus 26. It is in the recording region that the chart is moving at its maximum speed. By means of a deflecting plate 36, the chart 27 as it leaves the recording zone or station is lifted from the drive pins of the sprockets 31 and 32. Due to the change in the path of travel of the chart provided by the deflecting plate 36 and an associated supporting and decelerating structure 37 the chart is accordion-folded. Its speed rapidly decreases as it is folded and in a storage and inspection station it moves along guide rails 38 and 39, FIGS. 2–3, at relatively low speed. At the delivery end of the inspection station, the chart is unfolded and accelerated for return to the recording station.

In FIG. 1 a section of the chart has been lifted from the storage section to expose to view three panels 27a, 27b and 27c. Thus, these panels may be viewed for a period of seconds, approaching a half minute as a limit from the example given. Even though the chart has been completely unfolded, as indicated by the panels 27a–27c, nevertheless as the earlier produced records on the advancing panels are returned to the recording station, the panels 27c, 27b and 27a will in succession be drawn around guiding structure 40 and returned to the recording station.

In practice, and as best shown in FIG. 2a, the more usual way to visually inspect the chart will be simply to separate the folded chart to expose the selected panel for easy reading thereof without lifting the chart entirely from the storage station, as illustrated in FIG. 1.

In order to scan the converting disc 20, the opening 22a of the scanning belt 22 is moved radially of disc 20 and in alignment with the slit in masking plate 24. The scanning belt 22 in the embodiment of FIG. 1 has a length corresponding with the length of the chart 27 and it is driven by the same mechanical drive utilized for the chart, specifically by a sprocket 41 carried by drive shaft 33. The opposite end of the loop of the endless belt 22 is carried by an idler pulley 42. Thus, the scanning opening in its illustrated position has traversed the light transmitting discs in the measuring systems for the thermocouples 11d, 11c and 11b, each having balanceable networks and driving motors, etc. as indicated by the blocks 10B–10D, it being understood that in the example given there will be 149 of such systems with the one shown in detail comprising the 150th measuring assembly. Thus the stylus 26 will have been energized as from the outputs of the phototubes 23b, 23c and 23d associated with measuring systems 10B–10D.

With the above understanding of the system of FIG. 1, there will now be described in more detail and in connection with FIGS. 1–4 the chart handling mechanism, after which there will be described in detail the manner in which the scanning of the disc 20 produces a record on a panel of the chart.

In FIGS. 1–4 the chart handling mechanism includes, of course, a guide means for the chart which in the region of the chart and between the drive sprockets 31 and 32 comprises the deflecting plate 36 which, as best shown in FIG. 1, has an arcuate portion forming a curved support for the chart as it is driven along its path and also acting as a cooperating electrode with the stylus 26 for producing distinctive markings on the chart in a manner well known in the art. The deflecting plate 36 extends generally downwardly and approximately tangential to the arcuate portion, and thus in conjunction with chart retaining members 43 and 44, FIG. 4, directs the chart downwardly toward the supporting and decelerating plate 37. Thus, as the chart is moved in a counterclockwise direction between sprockets 31 and 32 beneath arcuate chart retaining members 43 and 44, it receives the record from the stylus 26 and is then lifted from the drive pins of each sprocket by the tangential portion of the deflecting plate 36. The change in direction of the chart as it leaves the end of the deflecting plate and its movement in the direction of the decelerating plate 37 greatly aids in producing the accordion folding of the chart as it is fed into the storage region 37s as best shown in FIG. 2.

Figure 9:
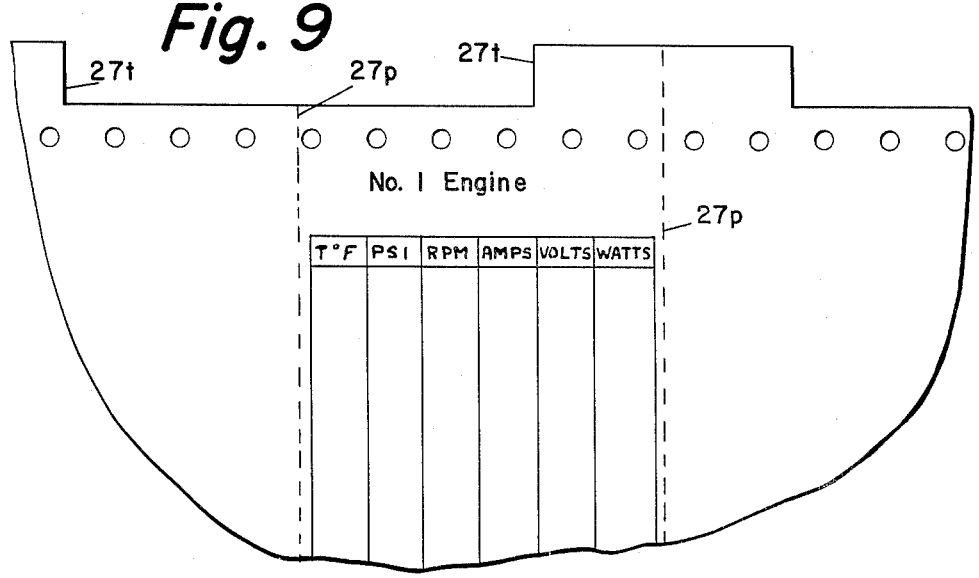
FIG. 9 is a portion of the strip chart of FIG. 1 showing suitable tab structure and a different kind of record which may be produced in accordance with the present invention.

As apparent in FIG. 1, and as best shown in FIG. 9, the endless chart has tabs 27t extending outwardly from the chart in the region of every other fold-line. Thus, the fold-lines 27p of the chart which do not have tabs from the lowermost folds of the accordion-folded chart. In FIG. 2, it will be noted that as the chart descends from the deflecting plate 36 and onto the deceleraing plate 37, the lower fold-lines engage that plate and sliding friction tends to slow up the movement of the lower portion of the chart. This frictional engagement also aids in the folding of the chart. Additionally, the speed of the chart is decreased, and sufficiently, to minimize the possibility of tearing the tabs 27t as they are lowered onto the guide rails 38 and 39 forming a part of the guide means of the chart handling mechanism. These guide rails, FIG. 3, preferably comprise inwardly turned upper edges of a U-shaped plate. The edge portions engage the edges of tabs 27t as shown in the enlarged view FIG. 2a. By thus minimizing the area of contact between each tab and its guide rail, there is developed a minimum of friction in the movement of the chart along the guide rails. In fact, the friction is sufficiently minimized that with the guide means as a whole inclined downwardly, as shown in FIG. 2, the chart will with a minimum of added force move along the guide rails due to gravity. Though the component of force due to gravity may be utilized, the frictional load on the chart is sufficiently low that the guide rails 38 and 39 may extend horizontally, or even be tilted upwardly a slight amount, if desired. In any event, the chart in the storage region 27s is relatively stationary, particularly the mid portion. Folded panels are added to the right-hand side of the pack at the same rate as panels are unfolded and removed from the left-hand side of the pack. As the panels are unfolded, they are accelerated until they again attain the speed of the drive sprockets 31 and 32 for passage beneath the chart marker 26. To assist in guiding the chart and reversing its movement, the guide means 37 includes a rounded return bend 40 at the left-hand end of the guide means. This arcuate guide may be formed integrally with, or separately from, the decelerating plate 37 and it may extend as at 40a throughout the return path of the chart.

A bed plate 45, FIG. 2, is provided below the return path of the chart to support the same when the mechanism is at standstill and also to guide the chart during operation in the event of slack developing during its operation. The guide plate 45 may form an integral part of the supporting frame for the mechanism as a whole. The extension of the guiding means comprising the portion 40a of plate 37 also serves to isolate the flow path of the chart from the storage region 37s and to provide access to the storage region above portion 40a and below the guide rails 38 and 39. Thus, as most clearly shown in FIG. 3, an operator may move his hand below the guide rail 38 and insert fingers through an opening 37b in plate 37 to move upwardly the panels within the storage region 37s so that they may be spread apart or lifted for visual inspection as illustrated in FIG. 1. It will generally be found that it is easier merely to spread the panels to viewing position, as illustrated in FIG. 2a. It will be observed that the right-hand end 40b of extension 40a of plate 37 has an arcuate shape to form a direction-changing guide for the paper as it moves from its horizontal to its vertical path onto the drive sprockets 31 and 32.

Though the marker 26 in FIG. 1 has been shown as driven by a violin string or endless belt 30, it is to be understood, as shown in FIG. 4, that the marking means for the chart may be driven in any conventional manner as, for example, by a threaded shaft 30a driven by motor 35 by way of a variable speed drive 29a, the carriage 28 of the stylus 26 having a threaded element by means of which the carriage 28 is moved across the chart. In this modification the carriage is slidably mounted on a guide rod 46 suitably supported from the frame. Inasmuch as both of the motors 29 and 35 of the embodiment of FIG. 1 are of the constant speed type, it will be seen that the single motor 35 of FIG. 4 may be utilized to perform the two functions. First, it drives through a conventional speed changer 29a, the shaft 33 and the chart as by the sprocket wheels 31 and 32 and the scanning belt 22 as by sprocket 41. The speed changer 29a also drives the threaded shaft which moves the stylus across the chart. The threaded shaft may be driven at any desired selected speed as, for example, a single traverse during the period of a normal working day. In this connection, it is understood, of course, that the speed changer 29a includes two independently adjustable variable speed drives so that the speed of the chart may be adjusted independently of the speed of traverse of the marker 26 across the chart.

With the above understanding of a preferred embodiment of the invention as it concerns the chart handing mechanism, it will be understood, of course, that modifications may be made. For example, tabs may be provided on only one of the two adjacent panels including a score-line effectively separating them. Single tabs on single panels may in some cases be adequate to support the weight of the adjacent panel. However, the illustrated construction has been found very satisfactory and appears to provide maximum strength since adjacent panels are supported at the same level by reason of the score-lines between the tabs. The tabs may be glued or otherwise secured to the chart instead of being formed integrally therewith as illustrated. The guiding structure for the chart may include rollers and other arrangements used in handling charts. Similarly, any suitable driving means for the chart will serve as well as the sprockets and chart perforations. For the application illustrated, the timing must be precise. However, for some applications it need not be. The series of openings in the chart, as illustrated, admirably serve their purpose, and each opening is preferably of slightly larger diameter than the maximum diameter of the drive pins of the sprockets. These pins may be slightly tapered with increasing diameter from tip to base to assist in the movement of the chart onto the pins into driving position and in removing the chart from the pins. By having the openings slightly larger than the drive pins, the chart settles into place with the pins centrally located in each opening. As the chart moves along the sprockets, the pins move forward and engage the leading edges of the walls forming the openings in the chart.

There will now be explained more in detail the manner in which the illustrated marking means for the chart is operated to produce on the chart distinctive records of the magnitudes of a condition in a preferred analog-decimal system. It is to be understood that the chart handling mechanism of the present invention is adapted for use with chart marking systems of various kinds and that the invention is not limited to the types now to be set forth. On the other hand, the chart marking systems of the present invention are well suited for recording on the endless prefolded chart which receives the record while moving at high speed, and yet which has a storage section where the chart moves at a sufficiently low speed as to permit considered or selective visual inspection of conditions under measurement as recorded on one or more panels of the chart.

Figure 5:
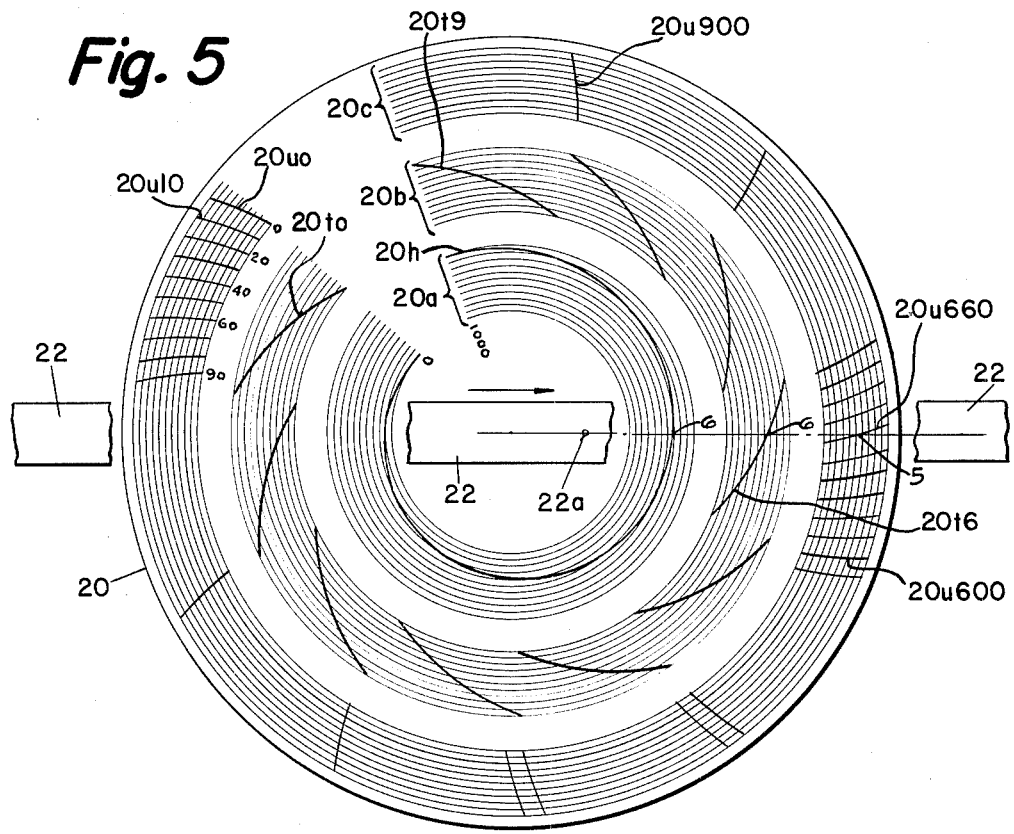
FIG. 5 is an enlarged view of a light transmitting disc suitable for use in the system of FIG. 1 and in which the transparent lines are shown in black and the opaque regions in white (as in a negative)

In FIG. 5, there has been illustrated in detail the light transmitting disc 20 of FIG. 1. Such a disc is made of transparent material, glass, plastic or the like, having an opaque coating with etched lines to provide for light transmission as from the light source 21, FIG. 1, to the photocell 23a. The light transmission occurs when the scanning opening 22a of the belt 22 coincides with one of the etched lines on the disc 20. Thus in FIG. 5 each black line represents an etching through the opaque material for passage of light through opening 22a. The opening 22a has been shown greatly enlarged in FIG. 5 since in practice its diameter will approximate that of the width of one of the heavier lines. It is to be observed that in FIG. 5 there appear three sections 20a, 20b and 20c, each comprising eleven circular scanning lines spaced one from the other. In each section there are thus provided ten spaces. The innermost circular line in section 20b is spaced from the outermost circular line of section 20a. Similarly, the innermost circular line of section 20c is spaced outwardly from the adjacent circular line of section 20b. These spacings between sections are provided as a matter of convenience but they need not be provided. They do produce on the chart separation of section 20a which will be representative in the decimal system of "Hundreds" from adjacent section 20b which is representative of "Tens," etc. Thus from the outer section to inner section, there will be provided ten spaces in each section for the Units, Tens, and Hundreds in the decimal system.

Figure 6:
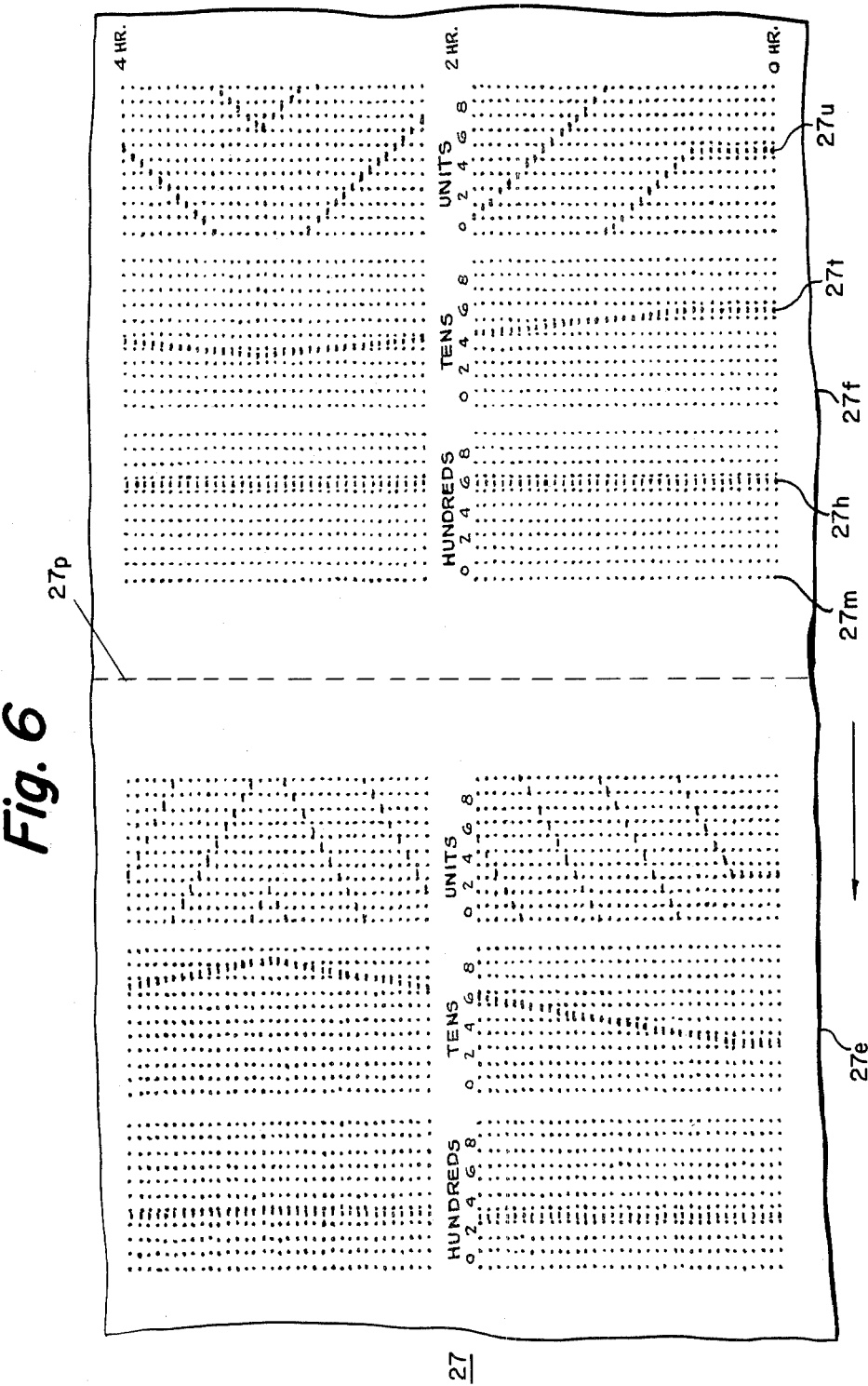
FIG. 6 is a plan view of a section of the chart showing portions of a pair of adjacent chart panels on which recordings have been made.

Neglecting for the moment the heavy lines on the disc 20, it will be assumed that the scanning opening 20a is moving outwardly of the disc. As it intersects the innermost circle of section 20a, light will be transmitted to the photocell 23a of FIG. 1 and the marker 26 will be energized to produce a mark 27n on the chart. The output of the photocell 23a and of the amplifier 25 will be proportional to the quantity of light received by the photocell 23a as determined by the relative widths of the transparent lines and the time of traverse thereof by the scanning opening 22a. The concentric lines are made quite narrow to provide a large contrast between them and the heavy lines illustrated on the disc. As shown in FIG. 6, the first mark produced on the chart 27, as just described, appears on a panel 27f as at the lower left-hand corner 27m. As the scanning opening 22a progresses across the eleven circular lines of section 20a, there are produced the eleven marks or dots and ten spaces for the section of the chart marked "Hundreds." Scanning opening 22a then traverses the space between the Hundreds section, and as it traverses the innermost circular line of section 20b, the stylus 26 begins to place on the chart eleven dots defining ten spaces comprising the "Tens" section. Similarly, the Units section of the chart is generated after the scanning opening 22a traverses the space between sections 20b and 20c and as it traverses the section 20c formed by the eleven circular lines at the outermost part of the disc.

Having now established chart calibration lines in the decimal system for the three orders of Hundreds, Tens, and Units, there will now be described the manner in which there is applied to the chart significant markings indicative of finite values of the variable expressed in the decimal system.

Returning to FIG. 1, those skilled in the art will understand that the potentiometer including the slidewire 12 will be calibrated or preset for the measurement of temperatures in accordance with any of the standard scales. For purposes of explanation, it will be assumed that the scale will have a lower limit of 0° F. and an upper limit of 1000° F. Thus, if the thermocouple 11a be subjected to any temperature within the range of from 0° to 1000° F. the contact 12a of the slidewire will be rotated to a corresponding position along the slidewire.

To plot the paths of the heavy lines on disc 20 the contact 12a is moved to its zero position. The light transmitting disc 20 is at the same time moved to its zero position. Thus the point marked "0" on the innermost circle of section 20a of FIG. 5 will be in a position coinciding with the travel path of the scanning opening 22a. A mark is now made to designate the 0° F. position on the innermost circle at the intersection of the circle and the radius in the path of 22a to the right of the disc center. The slidewire contact 12a is then moved to a balancing position for 100° F. and a mark applied to the disc 20 where the second circular line from the disc center intersects the radius traversed by opening 22a to the right of the disc center. The slidewire is then moved to 200° F. and another mark applied. The foregoing operations are continued until the upper limit of 1000° F. of the scale is attained.

It will be seen that the foregoing procedure generates points on a spiral 20h across the Hundreds section 20a. The opaque covering on disc 20 is then etched or engraved to produce the wider spiral opening 20h as shown by the heavy line in FIG. 5.

With the disc 20 in the position illustrated in FIG. 5, it will be seen that the spiral 20h crosses the radial travel path of the scanning opening 22a in the region of the seventh space between the circular lines of section 20a. Since the spaces between the circular lines of each of the sections 20a–20c correspond to the numbers 0, 1, 2, 3, 4, 5, 6, 7, 8 and 9 a light pulse occurring as the result of light being passed by the seventh space will produce illumination of photocell 23a of FIG. 1 and so produce the line 27h in the lowermost row of marks of FIG. 6 which is read as a "6" or 600 in the decimal system.

The disc 20 is provided with a segmented spiral 20t0–20t9 (only selected ones of the foregoing reference characters appearing in FIG. 5) generated in a similar way for the "Tens" section 20b. Thus as the slidewire contact 12a is moved, manually if desired, from its zero position successively to positions corresponding with 10, 20, 30, 40 degrees F., etc., marks are applied to the circular lines of section 20b to generate the segment 20t0. This segment will represent a scale span of 0 to 100 degrees F. For the section of the scale from 100° F. to 200° F. there will similarly be generated the segment 20t1. Since segment 20t6 representing a scale range of 600° F. to 700° F. appears across the path of the scanning opening 22a and the path of scanning opening 22a crosses segment 20t6 at the seventh space of the section 20b there is applied in the seventh space of the "Tens" section 20b of panel 27f the mark 27t representing the digit of "6," or "60" in the decimal system.

The final Units section 20c is similarly generated with a more highly segmented spiral comprising segments 20u0–20u990 (only selected one of the foregoing reference characters appearing in FIG. 5) representing scale ranges respectively of ten digits. Thus the first segment 20u0 represents a scale range of 0 to 10. The segment 20u10 displaced from segment 20u0 in conjunction with section 20b covers the Units portion of the scale range between 10 and 20. Similarly the segment 20u600 in conjunction with sections 20a and 20b covers the Units portion of a scale reading between 600 and 610. Only selected spiral segments have been illustrated for the Units section 20c in the interest of a clarified drawing. Since the section 20u660 is in the path of opening 22a and the path of 22a crosses section 20u660 at the sixth space of the outermost section 20c, the resulting light pulse to the photocell produces a mark 27u in the "Units" section of the chart panel 27f in the sixth space which represents a "5." The three marks 27h, 27t and 27u are read as "665."

It will now be seen that as the magnitude of the measured variable changes, the balancing motor 15 rotates the slidewire contact 12a to the balancing position, at the same time moving the light transmitting disc 20 to a corresponding position. As the scanning opening 22a then crosses the spiral corresponding with the "Hundreds" order, there is produced on the chart a mark indicative of the magnitude of the condition in the "Hundreds" order between 0 and 1000. Thereafter a mark is produced in the "Tens" order and finally a mark in the "Units" order so that from the chart it is readily apparent from the marks in any row the instantaneous magnitude of the condition.

It is to be remembered that the chart 27 is moving, FIG. 6, from right to left and that the recording of all of the marks giving rise to the foregoing reading of 665 takes place during the traverse of a single panel 27f beneath the marker 26. For each panel of the chart, the scanning opening 22a traverses a calibrated light transmitting disc or equivalent means associated with a measured variable. Thus for a complete round trip of the endless chart 27, there will be printed on the chart beginning at the lowermost row, records indicative of the magnitudes of the several conditions and these magnitudes are all expressed in the decimal system in analog form so that the trend of changes in the magnitude of a variable are observable at a glance and the digital values available upon closer inspection.

The chart 27 in FIG. 6 is moving from right to left, as shown by the arrow, and it will be seen that the marker or stylus will be moving upwardly from its initial position at the lower portion of the chart (which corresponds with its right-hand position in FIG. 1). The stylus as described in connection with FIG. 1 is moved by timing motor 29 at a uniform and in general rather slow speed. Instead of uniformly moving the marker or stylus 26, the drive from the motor 29, or in lieu thereof by use of a ratchet mechanism, may be intermittent. Thus after the lowermost row of marks have been produced on the chart of FIG. 6, and throughout the length of the chart, the stylus 26 will be stepped from the bottom toward the top a distance corresponding with the vertical spacing between the lowermost row of dots and the next adjacent row. This stepping arrangement has been utilized quite satisfactorily and the record from such an operation has been illustrated in FIG. 6. Had the record of FIG. 6 illustrated the operation with the timing motor driving the stylus at a uniform speed so as to cross the chart (from bottom to top) in eight hours of operation, the record would be indistinguishable to the eye from that illustrated in FIG. 6. While the stylus has been described as advancing from right to left in the modification of FIG. 1, it is to be understood that it may be advanced from left to right or top to bottom in FIG. 6.

All of the information recorded in detail on panel 27f of FIG. 6 reveals that the magnitude of the condition did not change in the "Hundreds" order during either the first or the second two-hour recording intervals there appearing. However, in the "Tens" order the magnitude of the condition is illustrated as decreasing from its initial value of 60 to a minimum value of 30 which occurred during the second two-hour section of the chart. Of course, many changes take place in the "Units" order. For an initial period of time the magnitude of the condition remained constant at 665. It then decreased at uniform rate to a value of 660, clearly indicated by the appearance of the heavy mark in the "zero" space of the Units section. As the magnitude of the condition continued to decrease the heavy mark in the Tens section moved to the sixth space to record a 5 and at the same time there appeared in the Units section a heavy mark in the tenth space indicative of the value 9. Thus the magnitude of the condition at the instant was 659. It continued to decrease again at a uniform rate until it had a value of 650. The foregoing operations again occurred for a decrease from 649 to 640 and then from 639 to 637. At this time the magnitude of the condition began to increase and it increased to a terminal value of 645 at the end of the four-hour period.

It is to be understood, of course, that if the whole of the chart were illustrated in FIG. 6 there would be an extended area for the remaining four hours of the eight-hour period normally used to correspond with an eight-hour shift or a working day, such requirements establishing the speed at which the stylus is advanced upwardly of the chart in FIG. 6.

With the above explanation of the manner in which the magnitudes of the measured variable are recorded and read from the chart, it is believed that the records on the panel 27e may be readily read. The magnitude of the condition or measured variable there recorded had an initial magnitude of 333. As shown in FIG. 6, the value of the condition increased to a high of 392 and then decreased to 373.

Though in FIG. 6 each panel is shown with the records in upper and lower sections, it is to be understood, of course, that this spacing has been provided for ease in illustrating a section of the chart and also for the purpose of relating the amount of information recorded with the passage of time. Thus, if the marker traverses each panel during a period of eight hours, there may be applied to the chart timing indicia which in one form may be represented by leaving a space on the chart at the expiration of each given interval of time. Thus the lowermost section of FIG. 6 may represent the passage of time corresponding with two hours. The intervening space will then indicate that the next section will cover a time interval of an additional two hours. From this it becomes evident that the portions of panels 27e and 27f illustrated represent about four hours of recorded information. The foregoing timing lines may be preprinted on the panels of the chart and in correlation with the normal speed at which the stylus will be driven. For the divisions of the sections into units of two hours as illustrated in FIG. 6 it is understood the stylus drive earlier described will have a time control to provide a wider step in the movement of the stylus at predetermined intervals of time than during intervening periods. If desired, the stylus may be utilized to provide additional marking on the chart by applying signals thereto at the margin of each panel at the end of each desired time interval.

It is to be noted that in FIG. 5 because of a difference in scale used to draw FIGS. 5 and 6 the distance between the innermost calibartion circle of section 20a and the outermost calibration circle of 20c occupies a radial dimension on the disc 20 less than illustrated in FIG. 6. The record in FIG. 6 has been enlarged for ease in illustration. In practice, it will be understood that when recording one measured variable per panel the width of each panel as viewed in FIG. 6 (in horizontal direction) and the radial dimension of the calibration lines of the scanning disc will be arranged so that the records produced on the chart will occupy substantially all of the horizontal dimension of each panel. Obviously, the magnitudes of a multiplicity of conditions may be recorded on each panel, though for ease in reading and otherwise, it will be preferred to utilize a single panel for each measured variable. In this connection, it is to be further noted that more than a single scanning opening 22a will ordinarily be utilized in the scanning belt 22 and that the several measuring systems, as 10A–10D, etc., will be disposed in staggered relationship and arranged so that as the scanning opening 22a moves outwardly from the outermost line of the light transmitting disc 20, a second opening will, as the next panel moves into position, move to the first calibration line of a similar disc to initiate the recording on the latter panel.

Instead of utilizing 150 instruments for 150 measured variables, a smaller number will ordinarily be provided with switching circuits arranged so that each instrument will be time-shared and will measure the magnitude of a multiplicity of measured variables in a manner well understood by those skilled in the art in connection with multiple point instruments currently in use.

Though there have been illustrated on the light transmission disc 20 of FIG. 5 three spirals superimposed on circular calibrating lines, it will generally be preferred to use only two orders, i.e., two concentric sets of calibration lines with a circular light transmission disc. However, the three orders illustrated and additional orders may be utilized as desired by converting arrangements which maintain a substantial angle between the additional segmented spirals or their equivalent and the travel path of the scanning opening 20a. By maintaining relatively high angularity, the resolution of reading is enhanced. This may be accomplished by utilizing a separate disc for the higher orders with increased speed of rotation thereof and mechanically driven from disc 20.

Instead of utilizing multiple discs, there may be provided linear light transmitting means as illustrated in FIGS. 7 and 8. As in the preceding embodiment, there will be utilized the scanning belt 22 having the scanning opening 22a arranged to be driven from the same driving means as the chart 27 (not shown in FIGS. 7 and 8). The scanning opening is moved in a linear path between a photocell 23a and a light source 21 to cross at right angles the linear light transmitting means 120. This linear means may comprise a photographic film, such as commercially used in motion picture cameras with the calibrating lines and lines indicative of the magnitudes of the condition in the several orders of the decimal system appearing thereon as transparent lines.

As in FIG. 6, the black lines of FIG. 8 will correspond with transparent lines in an opaque film. As shown in FIG. 7, the balancing motor 15 drives sprockets 47 and 48, the latter by means of a belt or cord 49 for transport of the film or belt 120. This film 120 may be of very great length, as compared with the circumference of the disc 20 of FIG. 1. To this end, the film 120 is arranged so that slack will be taken up at its opposite ends as by take-up rollers 50 and 51 respectively driven through overdrive means (not shown) which are known by those skilled in the strip chart recorder and film handling art. Spring type driving belts 52 and 53 are often used for this purpose. Such take-up rollers 50 and 51 are provided on movie projectors and the like, and like such arrangements, operate to maintain tension on the film and to provide the take-up action whenever the motor 15 moves the film toward the take-up rolls 50 or 51 as the case may be. The balancing motor 15 in FIG. 7 is illustrated as rotating a movable contact 54 in a spiral path and in engagement with a multiple-turn slidewire 55 of conventional construction. Thus in FIG. 7 there has been added the multiple-turn slidewire to replace the single-turn slidewire of FIG. 1, and the converting means is characterized by the fact that it includes light transmission means which may be of relatively unlimited length. In this way, the condition-representative line 120h, FIG. 8, in the Hundreds order (only a portion of which is shown for the 600 to 700 range) will be a straight line which extends across ten spaces between eleven horizontal lines and having its beginning and end at the opposite ends of the film.

As will be evident from the description of the system of FIG. 1, if slidewire 55 be one hundred inches long and a sclae range of 0 to 1000 is employed, the effective length of the film 120 may be one hundred inches. The diameters of sprockets 47 and 48, the ratio of gearing (not shown) between drive motor 15 and the sprocket 47, and the ratio of gearing (not shown) between drive motor 15 and slidewire contact 54 will be chosen so that one hundred inches of film 120 will pass the path of the scanning opening 22a as the slidewire contact travels from the zero-degree end to the 1000-degree end of the slidewire 55. Of course, longer or shorter films and/or longer or shorter slidewires may be employed and different gear ratios used as required to coordinate film motion with movement of the slidewire contact throughout the full range of movement of the converting means.

The diagonal lines representing the magnitude of the condition in the "Tens" order will be ten in number, only one of which, the line 120t3 wholly appears in FIG. 8. Similarly, the lines representative of the magnitude of the measured variable in the "Units" order will be one hundred in number, only some of which, 120u290–120u390 being shown with selected reference characters applied thereto. However, these ten, it will be observed, extend at 45° angles with respect to the scanning path of opening 22a, which scanning path will be in a vertical direction as viewed in FIG. 8. With the scanning path indicated by the line 22s, it will be seen that the magnitude of the condition is indicated as 334.

With the explanation of the invention of FIGS. 7 and 8, it will be understood at once that by extending the length and width of the film 120, additional orders in the decimal scale may be added with retention of the desirable scanning angle between magnitude-representing lines and the scanning path of the opening 22a.

The chart handling mechanism and associated measuring system also lends itself to the production of records of still different character which may be producted by a number of different arrangements.

Now that the principles of the invention have been explained in conjunction with several modifications, it is to be understood that further variations may be made within the scope of the appended claims.

The present invention broadly comprehends methods of and means for accumulating and displaying data of many kinds and in different ways. The paneled, accordion-folded chart stored edgewise lends itself to the reception and display of data in data-logging format as illustrated in FIG. 9 where the central panel has on it "No. 1 Engine" together with column headings of the various measured variables to be recorded on the chart and as derived from the "No. 1 Engine." Thus the stylus 26 or other marking means may be advanced from top to bottom, FIG. 9, and energized to produce page identifications, column headings and thereafter produce in the columns desired marking of magnitudes. These may be in the form of Arabic numerals produced by multiple stylii or a print wheel carrying such numbers, the marking means being movable along the chart as explained above but the marking being controlled partially in accordance with stored information and partially from information derived from a converter with or without buffer storage.

In order readily to identify panels provided for different measured variables, the margins of the panels contiguous with the convex folds and the supporting tabs themselves may be distinctively colored, may bear identifying indicia or labels, and/or other added tab-indexing arrangements may be utilized for ease in quickly locating data in the accordion-folded, edgewise stored pack, all without interfering with the operation of the endless chart already described.

The data accumulating and displaying system of the present invention is applicable where information is to be stored and later read whether or not related to magnitudes of conditions. In this broad aspect of the invention the multiple panel chart may include photo-sensitive or other types of sensitive record-receiving layers to receive data. Where the stylus 26 of the earlier figures is replaced by record-sensitive means there may be read from the chart the previously recorded records.

In this connection it is to be observed, FIG. 2, that the chart is applied to its transporting mechanism from the front as appearing in that figure. In this connection, all parts, as best shown in FIG. 4, are cantilever-supported from a side frame and thus to install an endless chart to the transporting mechanism the major portion thereof will be fan-folded and will be bodily inserted in the storage section 37s. The remaining portion will then be slipped over the guides 40, 40a and 40b and will be slipped into place on sprockets 31 and 32, hold-down elements 43 and 44 being movable to permit easy threading of the chart on the sprocket wheels. By thus providing for the mounting of the chart from the front of the machine, it will be seen at once if a particular section of the chart is to appear beneath the stylus 26 or if it be a read-out device, any selected panel may be located in that selected position. These hold-down elements 43 and 44 are carried by the end plates 43a and 44a, FIGS. 2 and 4, which, it will be noted, have mounting slots received by the shanks of a pair of screws, FIG. 2.

As just described, the accordion or fan-folded media in the form of chart panels or other fan-folded strip material has in general been in the form of an endless loop. It need not be. Thus, a large pack of fan-folded media may be placed in the storage means provided by the spaced rails 38 and 39 and one end of the pack withdrawn and threaded through the information applying zone for transport of the remaining part of the pack through that zone. The arrangement of the invention refolds the strip material into the storage region where it is supported edgewise instead of lying flat. Thus, material is fed from one end of a pack and it is returned to the opposite end of another pack, both ends of the chart always being available. Prior to withdrawal and subsequent to returning the strip-material, its motion is never appreciable compared to its linear motion in the direction of the panels as they are transported through the information applying zone. This means that for long charts if the ends of the chart be at the return end of the storage zone, a relatively long period of time is provided not only for inspection of the panels as described above but also for additions to the strip material and/or a shortening thereof by removal of sections therefrom. This advantage of the present invention may be utilized in many applications. It provides great flexibility in that the chart or fan-folded strip material can be added to and subtracted from as may be desired and without interruption of the recording or read-out mechanism.

Where the length of the strip material is to be very great indeed, for example, a mile long, it will be desirable to provide means for moving the prefolded pack along the storage region 27s, FIG. 2, in order continually to make room for the strip material as it is fed into the storage region from the sprockets 31 and 32 and the associated folding plates 36 and 37. While several arrangements may be utilized for this purpose, the one illustrated in FIGS. 10 and 11 will be found satisfactory. A pair of V-belts 38a and 39a take the place of the rails 38 and 39 and thus receive at their sharp edges the tabs 27t. The sharp edges of the V-belts enter quite far into the corner area between the tab and the body portion of each panel. The V-belts are both driven from a motor 100 through associated gearing 101, 102 and shafts 103 and 104, respectively having secured thereto driving pulleys 105 and 106 for the belts 38a and 39a.

Figure 11:
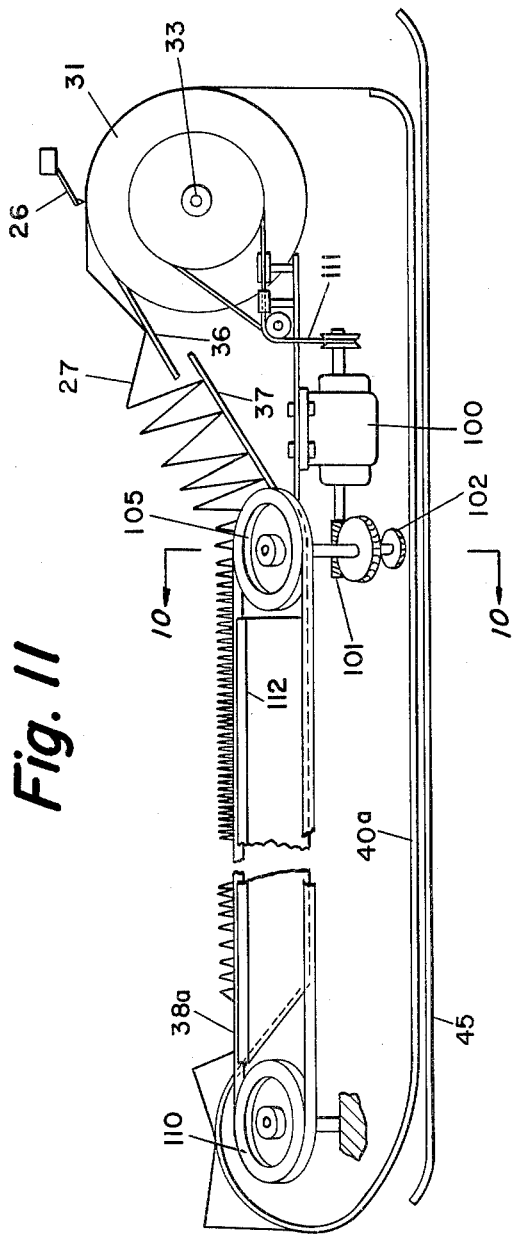
FIG. 11 is a front view of the apparatus embodying the modification of FIG. 10 with certain of the parts omitted for clarity of the drawing.

As best shown in FIG. 11, for the belt 38a there is provided an idler pulley 110 suitably supported from the frame and providing support for the belt.

It will also be observed that the motor 100 through a belt drive 111 drives the shaft 33 which, FIG. 4, carries the drive sprockets 31, 32 and 41 for the strip material and for the scanning belt 22. In this manner the V-belts 38a and 39a move slowly and in the storage region transport or assist in the transport of the pack of fan-folded material to move it from the receiving end to the discharge end of the storage zone. It is in this manner that the length of the chart can be made as great as may be desired.

Figure 10:
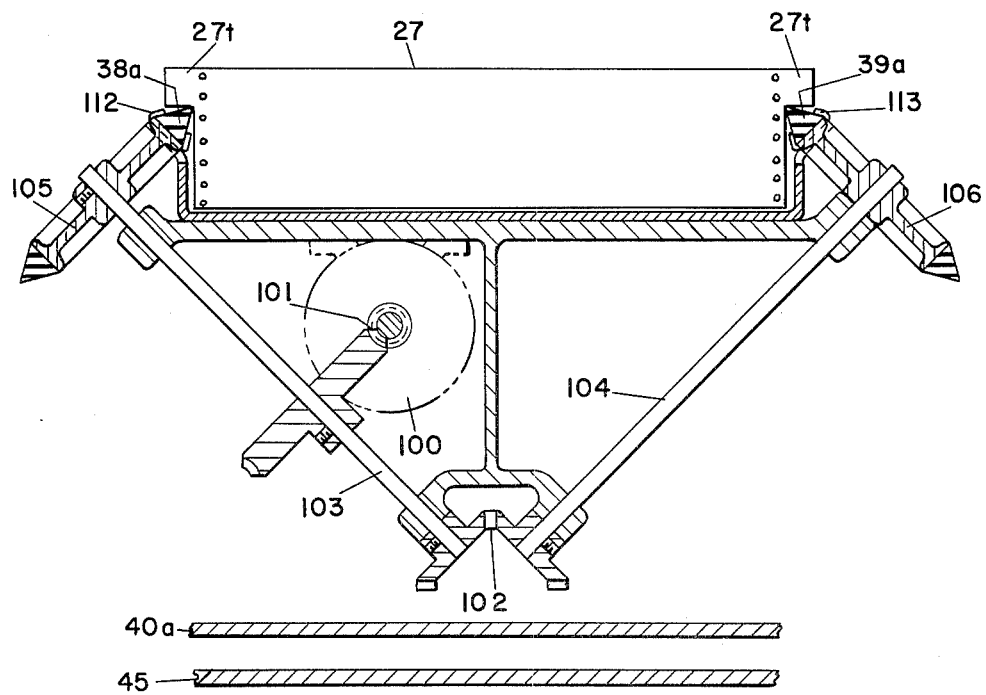
FIG. 10 is a sectional view of a modification of the invention taken on the line 10—10 of FIG. 11.

For strip material of conventional chart weight, a mile of it in fan-folded relationship will require a storage space approximately five feet long, a length which makes quite feasible the arrangement of the V-belts of FIGS. 10 and 11 for transport thereof. The V-belts 38a, 39a in the region between the pulleys are supported by U-shaped guide elements 112 and 113 supported from brackets secured to the frame. These elements extend throughout the storage region, only both of them appearing in FIG. 10 and only the element 112 appearing in FIG. 11.

What is claimed is:

1. A chart-handling mechanism comprising driving means for moving along a predetermined path an endless prefolded chart having fold lines by means of which the chart may be accordion folded into a plurality of individual panels, and guide means of substantial length extending along said path with a receiving end thereof disposed adjacent said driving means to receive thereon in succession and in supporting relation said panels as they are delivered thereto by said driving means, said guide means in a region of said path removed from said driving means having a configuration providing a change in the path of movement of the chart to induce said accordion folding of said panels, said guide means in a supporting region in which said accordion folding is taking place having a configuration for supporting the panels along the regions of their lowermost fold lines, said guide means in a region displaced from said supporting region having a storage region including means for receiving in supporting relation tabs outwardly extending from the chart and disposed near the apices of fold lines whereby said chart in said storage region displaced from said supporting means in supported in accordion folded relation along a substantial length of said guide means, said guide means in a region removed from said storage region having a configuration establishing a smooth path over which said chart is unfolded and the direction of movement reversed for return of the chart to said driving means.

2. The chart-handling mechanism of claim 1 in which said driving means includes rotary driving sprockets for extending through openings in the chart disposed along opposite edge portions thereof and in which said receiving end of said guide means comprises a plate extending in a direction substantially tangential to said driving sprockets, said sprockets driving said chart through a path which progressively lifts the chart from said driving sprockets, and in which said guide means in said supporting region is displaced downwardly from said guide plate to provide said change in said path of movement of said chart.

3. The chart-handling mechanism of claim 2 in which said drive sprockets are rotated at high speed and in which said supporting region in which said accordion folding takes place is a decelerating zone for said chart, said chart while accordion folded being moved along said guide means at low speed, and in which said chart has a length much greater than the path length including said guide means and said driving means.

4. The chart-handling mechanism of claim 1 in which said guide means in said region displaced from said supporting region comprises a pair of spaced guide rails between which access may be had to the lowermost fold lines of the accordion folded panels whereby any selected panels may be moved upwardly to expose said selected panels to view.

5. The chart-handling mechanism of claim 1 in which said driving means moves the unfolded portion of said chart at a speed in excess of that which permits visual inspection of the chart, and recording means disposed at a recording location coinciding with an unfolded portion of said chart for applying to said panels records, said panels with said records in the region of said accordion folding moving at low speed and being accessible for selected unfolding for view of the records thereon.

6. The combination with a prefolded chart having fold lines by means of which the chart may be accordion folded into a plurality of panels, said chart having tabs extending outwardly from said panels in the regions adjacent said fold lines, of guide means disposed in supporting relation with said outwardly extending tabs for storage of a substantial length of chart while accordion folded, driving means disposed adjacent said guide means for delivering said chart to said guide means in accordion folded relationship and for withdrawing from said guide means panel-by-panel said chart and delivering it to said driving means, and recording means disposed in the path of said unfolded chart for applying a record to said chart.

7. The combination of claim 6 in which said guide means in the region of said accordion folded chart provides access to the lower folds by means of which individual panels of said chart may be inspected by bodily raising selected panels upwardly to inspection positions.

8. The combination of claim 6, wherein said guide means for said fan-folded strip material in said storage region comprises spaced movable members engageable by said tabs from selected panels of said fan-folded strip material, and means for moving said movable members for transport of said fan-folded strip material from said receiving end of said supporting means toward said discharge end thereof.

9. The combination of claim 8 in which said movable members comprise V-belts supported on pulleys and in which driving means are provided synchronously to move said V-belts.

10. The chart-handling mechanism of claim 5 in which said recording means comprises a chart-marker mounted for movement laterally of the direction of movement of said chart and which also includes measuring means responsive to the magnitudes of a plurality of conditions connectible in succession to said marking means, means for connecting said measuring means in succession to said chart-marker for applying records of the magnitudes of each condition to its corresponding panel of said chart, and means for moving said chart-marker laterally of said chart to displace laterally of the path of movement of the chart the records successively applied to each said panel of said chart.

11. The chart-handling mechanism of claim 10 in which said measuring means includes means for producing chart-marking signals for the several orders in the decimal system including the units, tens and hundreds orders and for developing on said chart a plurality of marks representative of values from zero to nine in each order and for producing additional distinctive marks for indicating the value in each order of the magnitude of the condition then being recorded on a selected panel of said chart.

12. The chart-handling mechanism of claim 11 in which said means for producing said marks on said chart comprises a member having light-transmitting paths corresponding with the marks produced on said chart delineating the values zero to nine in each of said orders and having additional light paths traversing said first-mentioned paths of each order for producing said distinctive marks, a light source and a light-sensitive means disposed on opposite sides of said member for controlling the energization of said chart-marker, and an opaque scanning member having a scanning opening movable in synchronism with said chart for producing successive energization of said light-sensitive means and of said chart-marker for producing said marks.

13. The chart-handling mechanism of claim 12 in which said measuring means includes a condition-responsive measuring circuit of the null type, said circuit having circuit-unbalancing means operative in response to change in the magnitude of the condition and a circuit-balancing means operable to balance said circuit, and means for relatively moving one with respect to the other said member having said light-transmitting paths and said associated light source and light-sensitive means for producing said signals representative of digits in the hundreds, tens and units orders which together form representations in the decimal system of the magnitude of said condition.

14. The combination, comprising
   driving means for moving through a recording zone an unfolded portion of an endless prefolded chart at a speed in excess of that which permits visual inspection of a record on said chart,
   means for recording data on the panels of said chart as they are moved through said recording zone,
   a receiving and storage zone horizontally spaced from said recording zone in which a long length of said chart comprising a large number of said panels may be temporarily stored in vertical array, said storage zone having an unobstructed top through which any of the individual panels may be separated for inspection and through which selected panels may be withdrawn and unfolded for visual inspection,
   means for guiding said chart into a receiving end of said storage zone with said panels vertically disposed therein, and
   guiding means for withdrawal by said driving means of said folded chart from a delivery end of said storage zone and for delivery unfolded to said recording zone for reception of further data thereon.

References Cited by the Examiner
UNITED STATES PATENTS

| | | | |
|---|---|---|---|
| 1,146,998 | 7/1915 | Bryce | 346—134 |
| 1,221,895 | 4/1917 | Odell | 346—134 |
| 2,446,400 | 8/1948 | Woolley | 346—22 |
| 2,742,284 | 4/1956 | Munroe | 226—118 |
| 2,908,767 | 10/1959 | Fritzinger | 226—118 |
| 2,909,107 | 10/1959 | Simjian | 346—22 |
| 3,078,023 | 2/1963 | Hecker | 226—118 |
| 3,123,269 | 3/1964 | Morley et al. | 226—118 |

LEYLAND M. MARTIN, *Primary Examiner.*

LEO SMILOW, *Examiner.*